United States Patent [19]

Joyce

[11] 4,295,203

[45] Oct. 13, 1981

[54] AUTOMATIC ROUNDING OF FLOATING POINT OPERANDS

[75] Inventor: Thomas F. Joyce, Burlington, Mass.

[73] Assignee: Honeywell Information Systems Inc., Waltham, Mass.

[21] Appl. No.: 92,907

[22] Filed: Nov. 9, 1979

[51] Int. Cl.³ .............................................. G06F 7/48
[52] U.S. Cl. ..................................... 364/748; 364/745
[58] Field of Search ................................ 364/748, 745

[56] References Cited

U.S. PATENT DOCUMENTS 3,434,114 3/1969 Arulpragasam et al. ........ 364/745 X
3,699,326 10/1972 Kindell et al. ....................... 364/745
3,842,250 10/1974 Anderson ............................. 364/745
4,208,722 6/1980 Rasala et al. ..................... 364/748 X Primary Examiner—David H. Malzahn
Attorney, Agent, or Firm—George Grayson; Nicholas Prasinos; Ronald T. Reiling

[57] ABSTRACT

If the firmware calls for an operand rounding operation, apparatus in the Scientific Instruction Processor (SIP) tests the bit to the right of the low order bit of the normalized operand to determine if a rounding cycle is required. If the operand requires a normalization cycle or a mantissa overflow correction cycle, the rounding operation is performed in those cycles.

7 Claims, 4 Drawing Figures

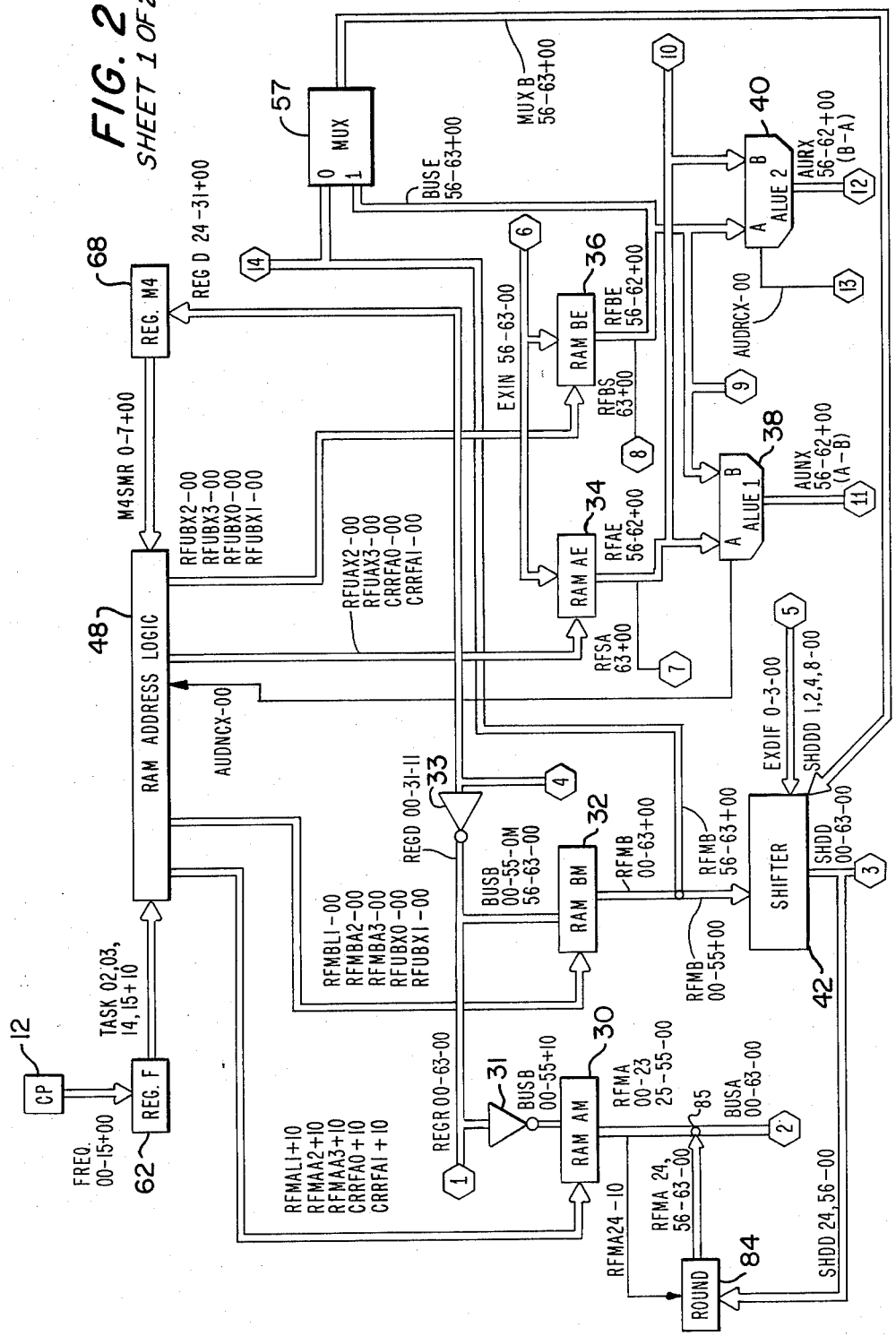
FIG. 2 SHEET 1 OF 2

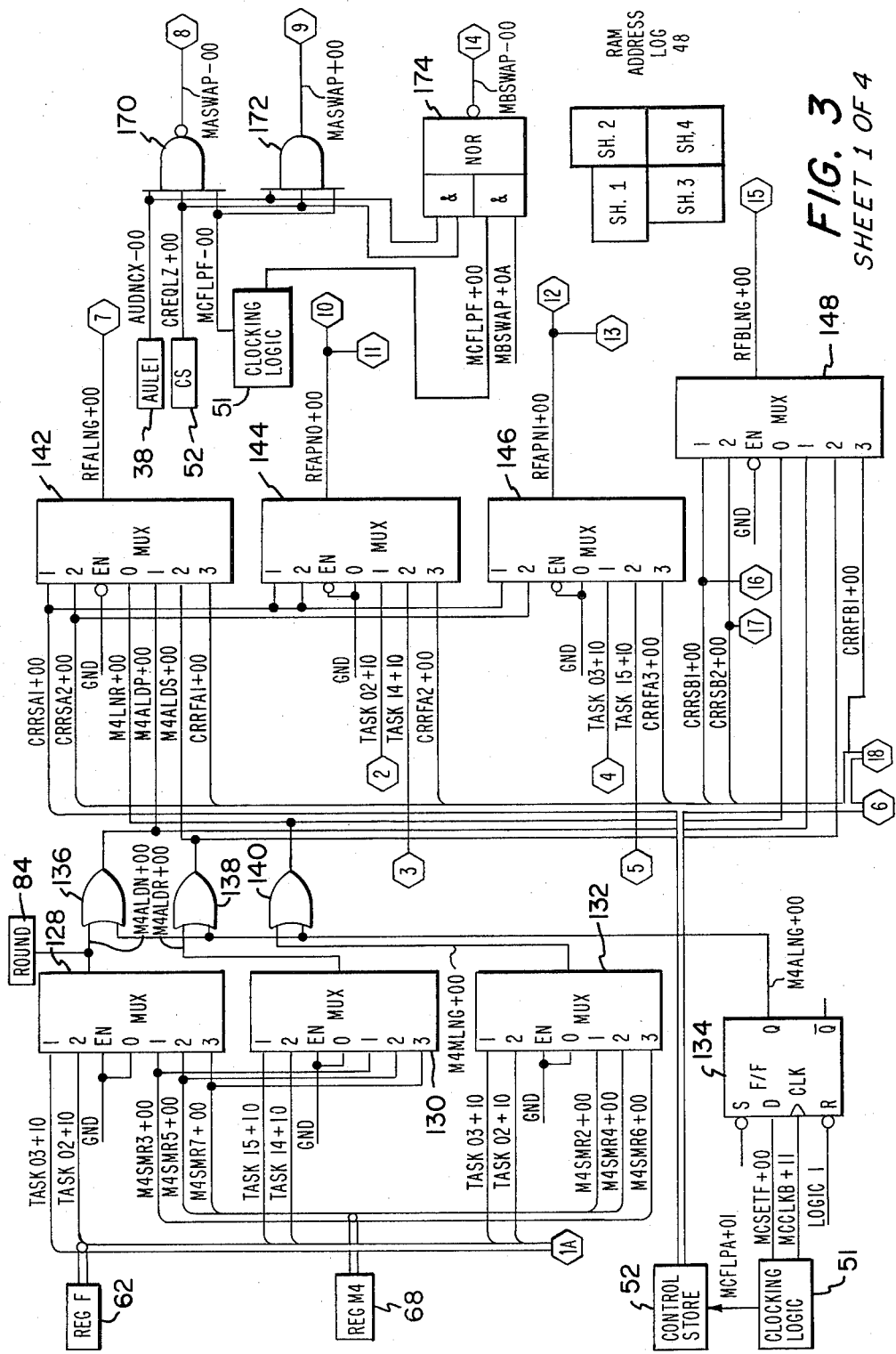
FIG. 3 SHEET 1 OF 4

ROUND 84

AUTOMATIC ROUNDING OF FLOATING POINT OPERANDS

RELATED APPLICATIONS

1. "Automatic Operand Length Control of the Results of a Scientific Arithmetic Operation", invented by Thomas F. Joyce, Richard A. Lemay and William E. Woods, Ser. No. 092,619, filed on Nov. 8, 1979 and assigned to the same assignee as named herein.

2. "Apparatus for Performing the Scientific ADD Instruction", invented by Thomas F. Joyce, Richard A. Lemay, William E. Woods and Richard P. Brown, Ser. No. 093,096, filed on Nov. 8, 1979 and assigned to the same assignee as named herein.

3. "A Hexadecimal Digit Shifter Output Control by a Programmable Read Only Memory", invented by Thomas F. Joyce and David E. Cushing, Ser. No. 092,810, filed on Nov. 9, 1979 and assigned to the same assignee as named herein.

BACKGROUND OF THE INVENTION

1. Field of Use

The invention relates generally to scientific instruction processors and more specifically to the rounding operation of operands.

2. Description of the Prior Art

Rounding is the arithmetic operation whereby the least significant digits retained in a truncation of an operand are adjusted to partially reflect the dropped portion of the operand.

Prior art systems such as those described in U.S. Application Ser. No. 000,398 which was, filed Jan. 2, 1979, entitled "Apparatus for Improving the Rounding Operation for Long Operands" require a separate arithmetic cycle for performing the rounding operation. This separate cycle is required even if there is no rounding carry-over into the least significant bit or digit position.

Other systems such as the Honeywell Level 6/40 system perform the rounding operation and require a number of firmware cycles.

The prior art systems have the disadvantage of performing the rounding operation by requiring an excessive number of machine cycles or by requiring a separate machine cycle to perform the rounding operation.

It should be understood that the references cited herein are those with which the applicants are aware and are presented to acquaint the reader with the level of skill in the art and may not be the closest reference to the invention. No representation is made that any search has been conducted by the applicants.

OBJECTS OF THE INVENTION

Accordingly, it is a primary object of the invention to provide a scientific instruction processor with improved apparatus for performing the rounding operation.

It is another object of the invention to provide an improved scientific instruction processor which performs the rounding operation only when there is a carry into the least significant bit position of the result.

It is still another object of the invention to provide an improved scientific instruction processor which may perform the rounding operation on the same cycle as other arithmetic functions.

BRIEF DESCRIPTION OF THE DRAWINGS

The novel features which are characteristic of the invention are set forth with particularity in the appended claims. The invention itself, however, both to organization and operation may best be understood by reference to the following description in conjunction with the drawings in which:

SUMMARY OF THE INVENTION

The result of a scientific arithmetic operation in a short or a long operand form may require normalization or overflow mantissa correction, and also may require rounding. If the result is normalized and does not require overflow mantissa correcting and rounding is called for by the firmware, then apparatus tests the bit position to the right of the least significant bit of the result. If the bit is at binary ONE, a rounding cycle is initiated. If the bit is at binary ZERO, no rounding cycle is initiated.

If a normalization or an overflow mantissa correction cycle is required and rounding is called for by the firmware, then the result is rounded during the normalization cycle or during the overflow mantissa correction cycle.

Rounding is accomplished by adding the binary bit to the right of the least significant bit to itself. If a carry results, it is added into the least significant bit position of the short or the long operand result.

DESCRIPTION OF THE PREFERRED EMBODIMENT

Figure 1:
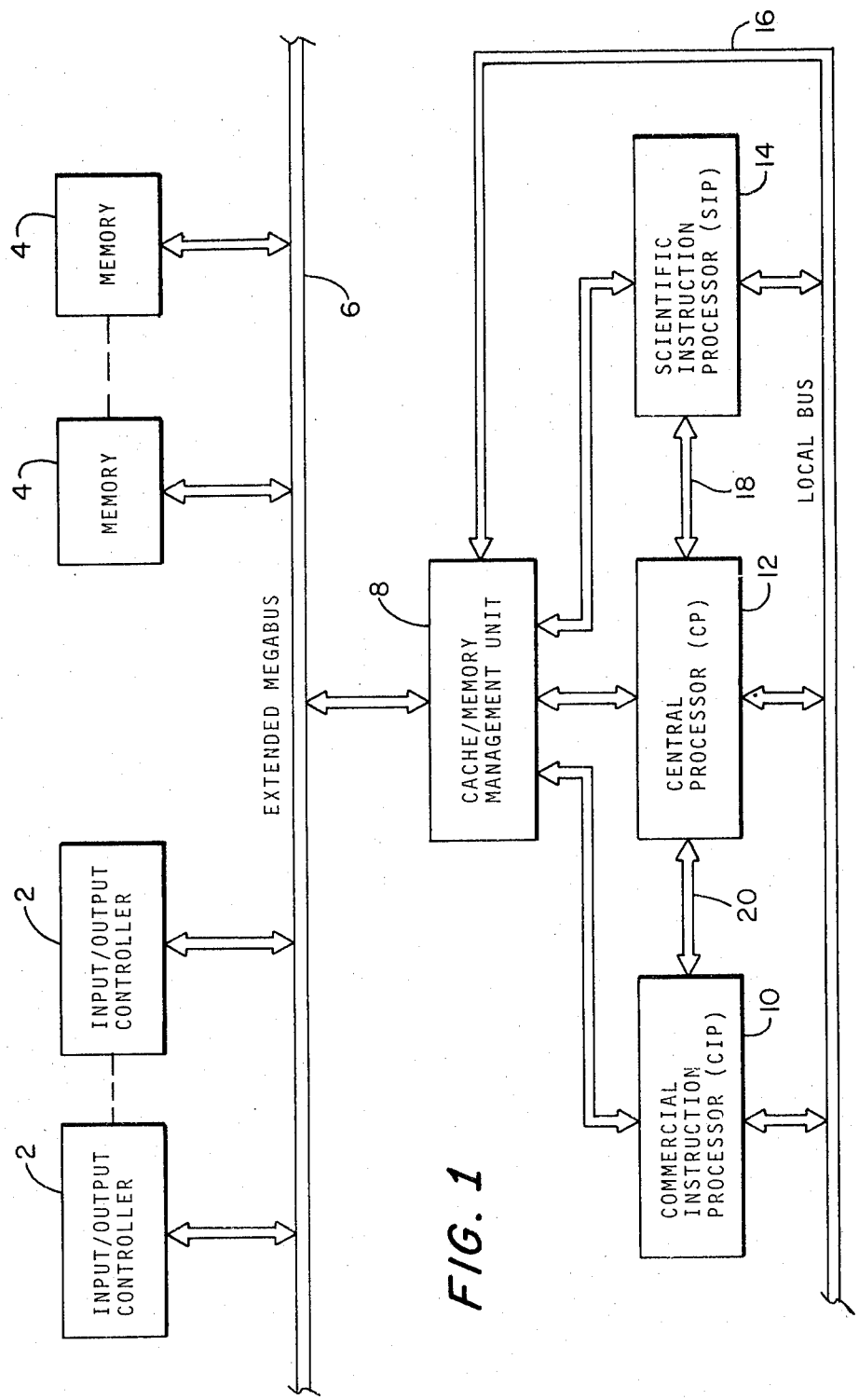
FIG. 1 is the overall block diagram of the system.

FIG. 1 shows a block diagram of the overall system in which the present invention may be incorporated which includes a plurality of input/output controllers 2 and a plurality of memory modules 4 coupled in common to an extended bus 6. Also coupled to bus 6 is a cache/memory management unit 8.

The system further includes a central processor (CP) 12, a commercial instruction processor (CIP) 10, and a scientific instruction processor (SIP) 14 coupled in common to a local bus 16 and also coupled to the cache/memory management unit 8 which is also coupled to bus 16. The SIP 14 and CP 12 are coupled by a CP-SIP bus 18. CP 12 and the CIP 10 are also coupled by a CP-CIP bus 20.

The functions of the input/output controllers 2 and memory 4 are well known in the art and will be described only as they relate to the invention. The CP 12 receives information in the form of computer instructions from cache/memory management unit 8. The SIP 14 executes scientific instructions received by CP 12 which include floating point instructions. The CIP 10 executes instructions received by the CP 12 to facilitate the processing of character strings and decimal data.

The signs of the first and second operands are applied to the first ALU to indicate the arithmetic operation to be performed.

The instant invention improves the performance of the rounding operation. The scientific ADD instruction is used in this embodiment as a means for describing the rounding operation.

A floating point operand can be 32 bits or 64 bits in length including a 7 bit exponent, a 1 bit matissa sign, and either a 24 or 56 bit mantissa. The exponent is in excess 64 form with the range of value from −64 to +63. The mantissa is negative when the sign bit is at logical ONE and positive when the sign bit is at logical ZERO. The mantissa is a fractional number with the hexadecimal point to the left of the high order bit of the mantissa.

The scientific ADD instruction adds the contents of the effective address (EA) in memory 4 to the contents of a scientific accumulator in SIP 14, and the result is stored in the accumulator. For the purposes of discussion, operand # is stored in scientific accumulator # (SA#) and operand N is stored in the EA.

The scientific ADD therefore performs the operation of (SA#)←(SA#)+(EA) where () indicates "the contents of".

Figure 2:
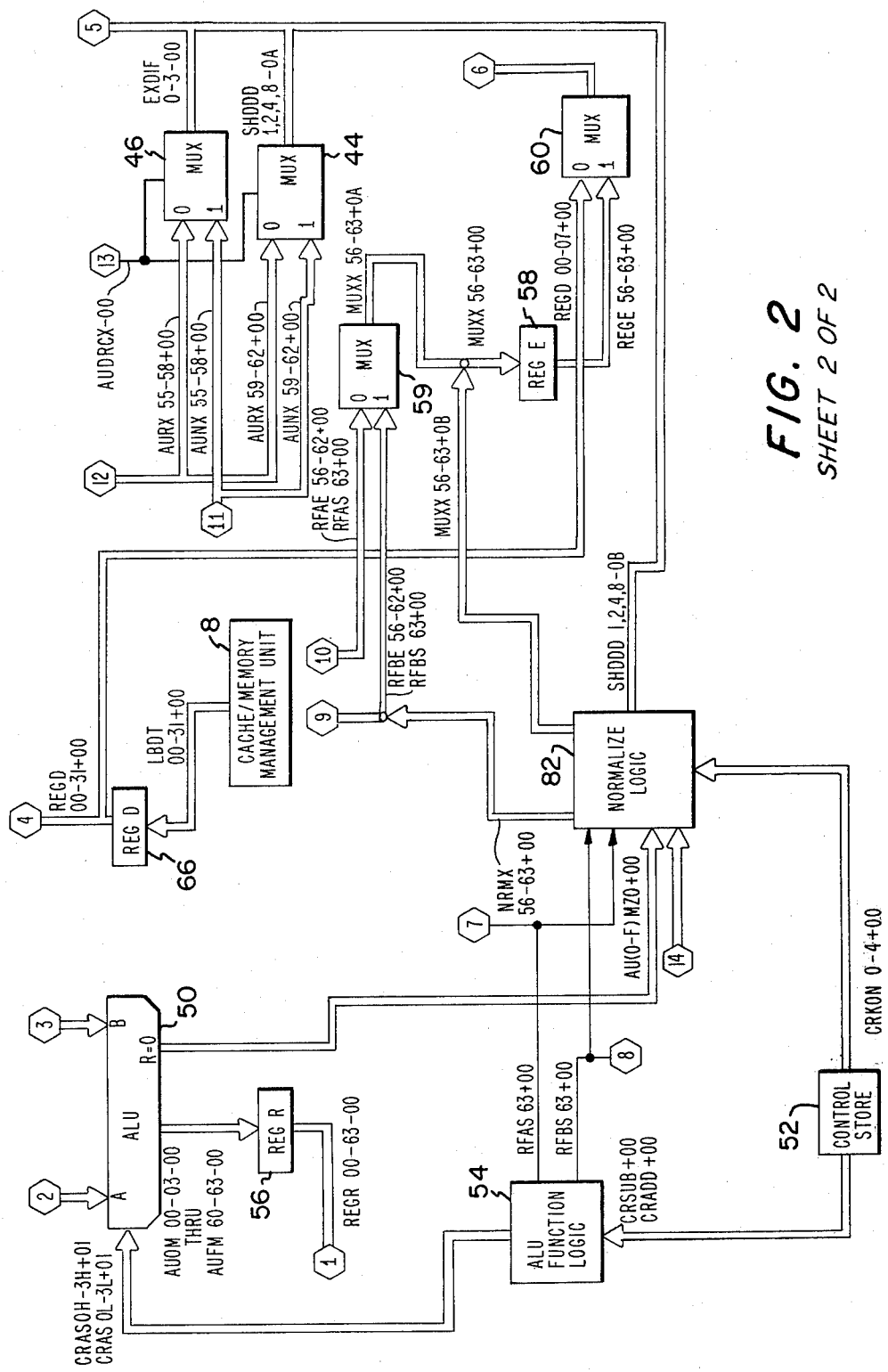
FIG. 2 is the overall block diagram of the scientific instruction processor.

FIG. 2 shows an overall block diagram of the SIP 14. RAMAM 30 is a 56 bit by 16 address location random access memory (RAM) and stores the mantissa of operand # and operand N. It comprises 14 74S189 circuits. Three address locations are set aside as scientific accumulators One of the scientific accumulators is assigned by the SIP 14 logic as SA# and a second scientific accumulator which stores the (EA) is assigned as SAN.

RAMBM 32 is a 64 bit by 16 address location random access memory and stores the mantissa of operand # in SA# and the mantissa of operand N in SAN. It comprises 16 74S189 circuits. RAMAE 34 and RAMBE 36 are 8 bit by 16 address location random access memories and store the exponent and mantissa signs of operand # and operand N in both RAMAE 34 and RAMBE 36. Each RAM, RAMAE 34 and RAMBE 36, comprises two 74S189 circuits. The 74S189 circuits are described in "The TTL Databook for Design Engineers", Second Edition, published by Texas Instruments. For the scientific ADD instruction, the exponent and mantissa signs of operand # are selected as the output signals of RAMAE 34, and the exponent and mantissa sign of operand N are selected as the output signals of RAMBE 36.

Both the RAMAE 34 and the RAMBE 36 output signals are coupled to arithmetic logic units ALUE1 38 and ALUE2 40. ALUE1 38 and ALUE2 40 are each made up of two 74S181 circuits. The exponent of SA# is read from RAMAE 34 and is applied to the A input terminal of ALUE1 38 and the B input terminal of ALUE2 40 as output signals RFAE56-62+00. Similarly, the exponent of SAN is read from RAMBE 36 and is applied to the A input terminals of ALUE2 40 and the B input terminals of ALUE1 38 as output signals RFBE56-62+00.

ALUE1 38, by means of an AUDNCX-00 signal applied to RAM address logic 48, indicates the operand with the smaller exponent and selects that mantissa to be read from RAMBM 32 and applied to shifter 42. The output signals AUNX56-62+00 and AURX56-62+00 of ALUE1 38 and ALUE2 40 respectively also indicate the magnitude of the difference, which is applied to the shifter 42 to shift the mantissa of the operand with the smaller exponent to the right the number of places required to align the two mantissas for the scientific ADD operation.

MUXs 44 and 46 select the two hexadecimal digits which represent the absolute difference between the exponents in SA# and SAN. ALUE1 38 indicates the difference of the SA# exponent minus the SAN exponent, and ALUE2 40 indicates the difference of the SAN exponent minus the SA# exponent.

A logical signal AUDRCX-00, an output signal of ALUE2 40, is applied to the select terminals of MUXs 44 and 46, and when at logical ZERO, indicates that the operand N exponent is larger than or equal to the operand # exponent. The AURX 55-62 output signals are selected through MUXs 44 and 46 and are applied to shifter 42 by means of output signals SHDDD 1,2,4,8-00 and EXDIF 0-3-00, which indicate the magnitude of the number of hexadecimal digits to be right shifted. The logic signal AUDRCX-00 at logical ONE indicates that the operand # exponent is larger than the operand N exponent. The AUNX 55-62 outputs are selected through MUXs 44 and 46 for transfer to the shifter 42.

If the SA# mantissa is selected from RAMAM 30, then the SAN mantissa is selected from RAMBM 32 and vice versa. RAM address logic 48 address select signal RFMBL1-00, RFMBA2-00, RFMBA3-00, RFUBX0-00 and RFUBX1-00 select the mantissas of SAN or SA# of RAMBM 32. Address select signals RFMAL1+10, RFMAA2+10, RFMAA3+10, CRRFA0+10 and CRRFA1+10 select the mantissas of SAN or SA# of RAMAM 30.

The output signals RFMB00-55+00 of RAMBM 32 and eight trailing zeroes, which output a MUX 57, are applied to shifter 42 and shifted the number of positions to the right specified by signals EXDIF0-3-00 and SHDDD1,2,4,8-00. The shifter 42 output signals SHDD00-63-00 are applied to the B input terminals of an ALU 50. The output signals RFMA00-23, 25-55-00 and RFMA24, 56-63-00 are applied to a junction 85. Signals BUSA00-63-00 are applied to the A terminal of ALU 50 from junction 85. ALU 50 comprises 16 74S181 circuits. The result signals AU0M00-03-00 through AUFM60-63-00 are stored in a register REGR 56. The output signals REGR00-63-00 are applied to the input of RAMAM 30 and RAMBM 32 to be written into the address location defined as SA#. The larger exponent and its mantissa sign are written into SA# of RAMAE 34 and RAMBE 36 through a multiplexer (MUX) 59, a register REGE 58, and a MUX 60 under firmware control.

A normalization cycle is required if the high order hexadecimal digit is a hexadecimal ZERO. Signals AU(0-F)MZ0+00 applied to normalize logic 82 from the ALU 50 indicate which of the 16 hexadecimal digits are at hexadecimal ZERO. Normalize logic 82 generates shift signals SHDDD 1,2,4,8-OB which are applied to the shifter 42. Shifter 42 shifts the operand result read from SA# of RAMBM 32 to place the most significant hexadecimal digit in the high order position of the operand. Signals NRMX56-63+00 are applied to the B input terminal of ALUE1 38 to indicate the number of leading hexadecimal ZEROs in the operand to be normalized. Signals NRMX56-63+00 are subtracted from signals RFAE56-62+00 in ALUE1 38.

Signals AUNX56-62+00, the output of ALUE1 38, as well as mantissa sign signal RFAS63+00, are selected to generate the MUXX56-63+OB exponent signals during the normalization cycle. Signals MUXX56-63+OB indicate the exponent value and mantissa sign of the normalized result and are stored in REGE 58.

The scientific accumulators SA1, SA2, and SA3 are assigned to address locations 5, 6 and 7 respectively of RAMAM 30, RAMBM 32, RAMAE 34, and RAMBE 36.

An output register REGF 62, loaded from CP 12 by signals FREQ00-15+00, stores signals TASK02+10 and TASK03+10, which define the address location of SA#, and signals TASK14+10 and TASK15+10, which define the address location of SAN of address locations 5, 6 and 7. One of the scientific accumulators SA1, SA2, or SA3 is designated as SA# and one of the scientific accumulators is designated as SAN. A register REGM4 68 stores indications of the word length of the accumulators and the operands transferred from memory (two words of 32 bits or four words of 64 bits). REGM4 68 is loaded from REGD 66 through signals REGD24-31+00.

Signals RFMA24-10 and SHDD24, 56-10 are applied to round 84, which applied signals RFMA24, 56-63-00 to junction 85.

Inverter 31 provides proper polarity of the BUSB00-55+10 input signal to RAMAM 30. Inverter 33 isolates the REGR 56 and REGD 66 output signals.

ALU function logic 54 controls the ALU 50 operation. The firmware signals CRSUB+00 and CRADD+00 as well as the mantissa sign signals RFAS63+00 and RFBS63+00 indicate functions the ALU 50 is to perform by means of output signals CRAS0H-3H+01 and CRAS0L-3L+01.

Figure 3:
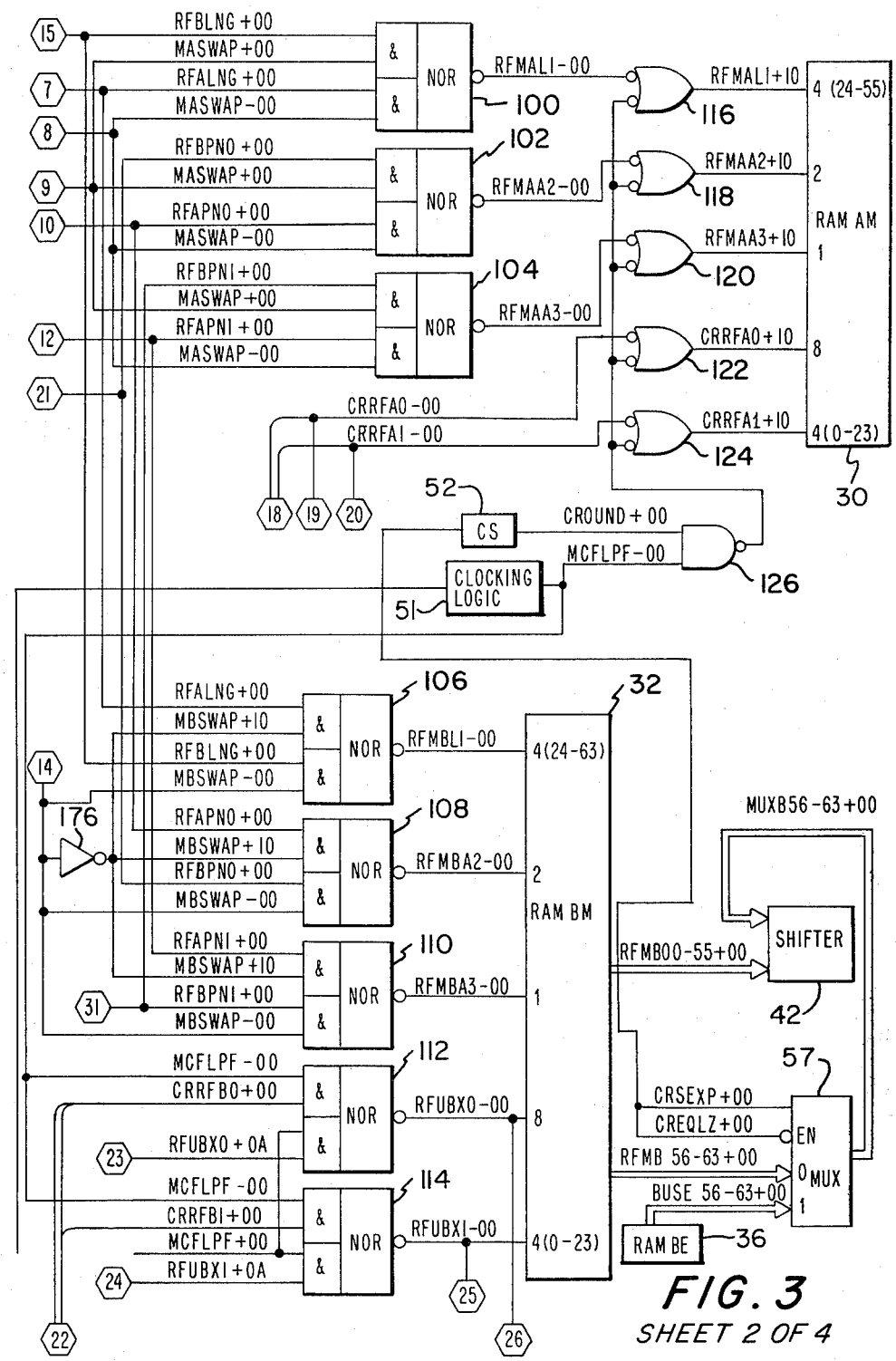
FIG. 3 is a detailed diagram of the addressing logic.
Figure 3:
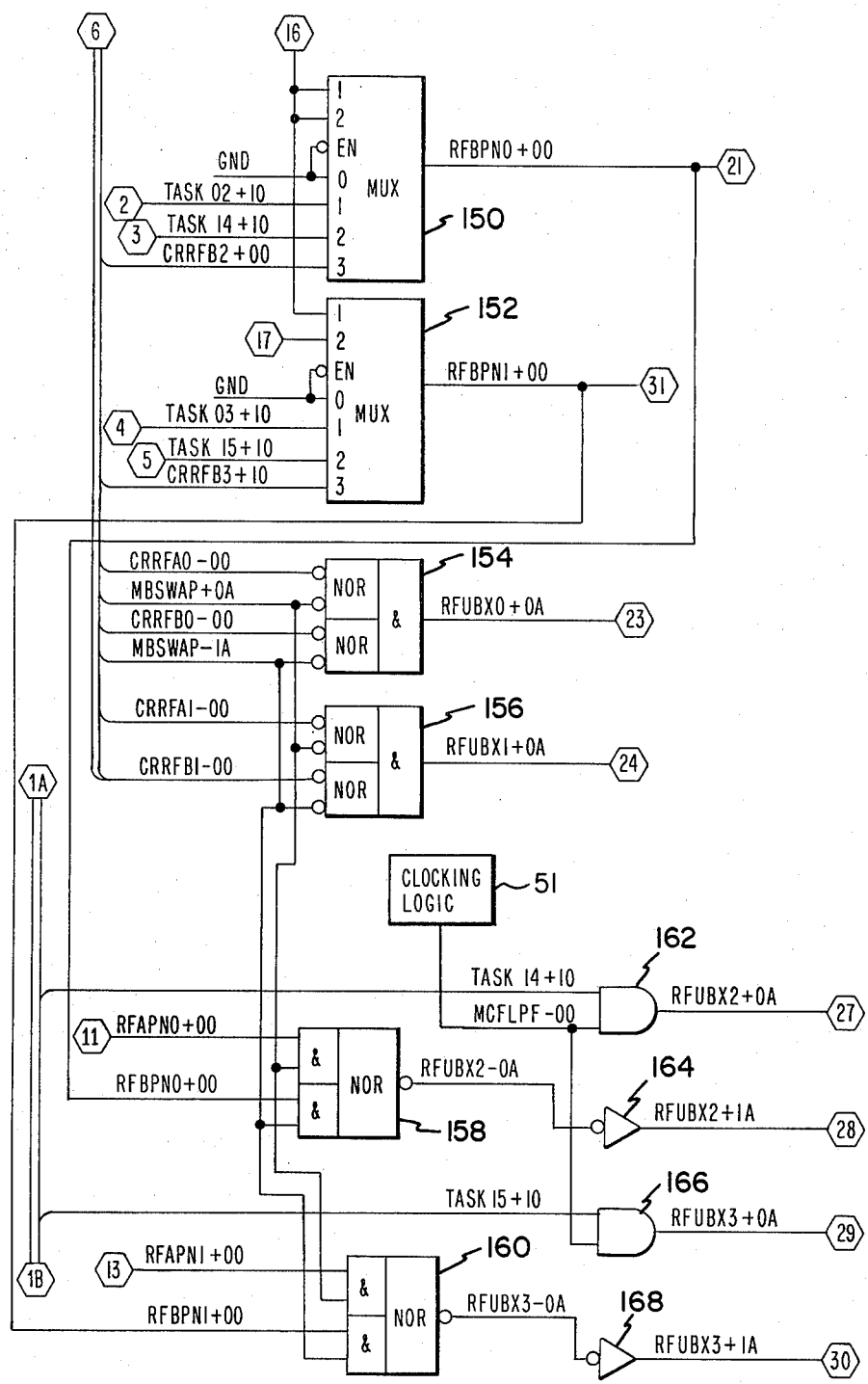
Figure 3:
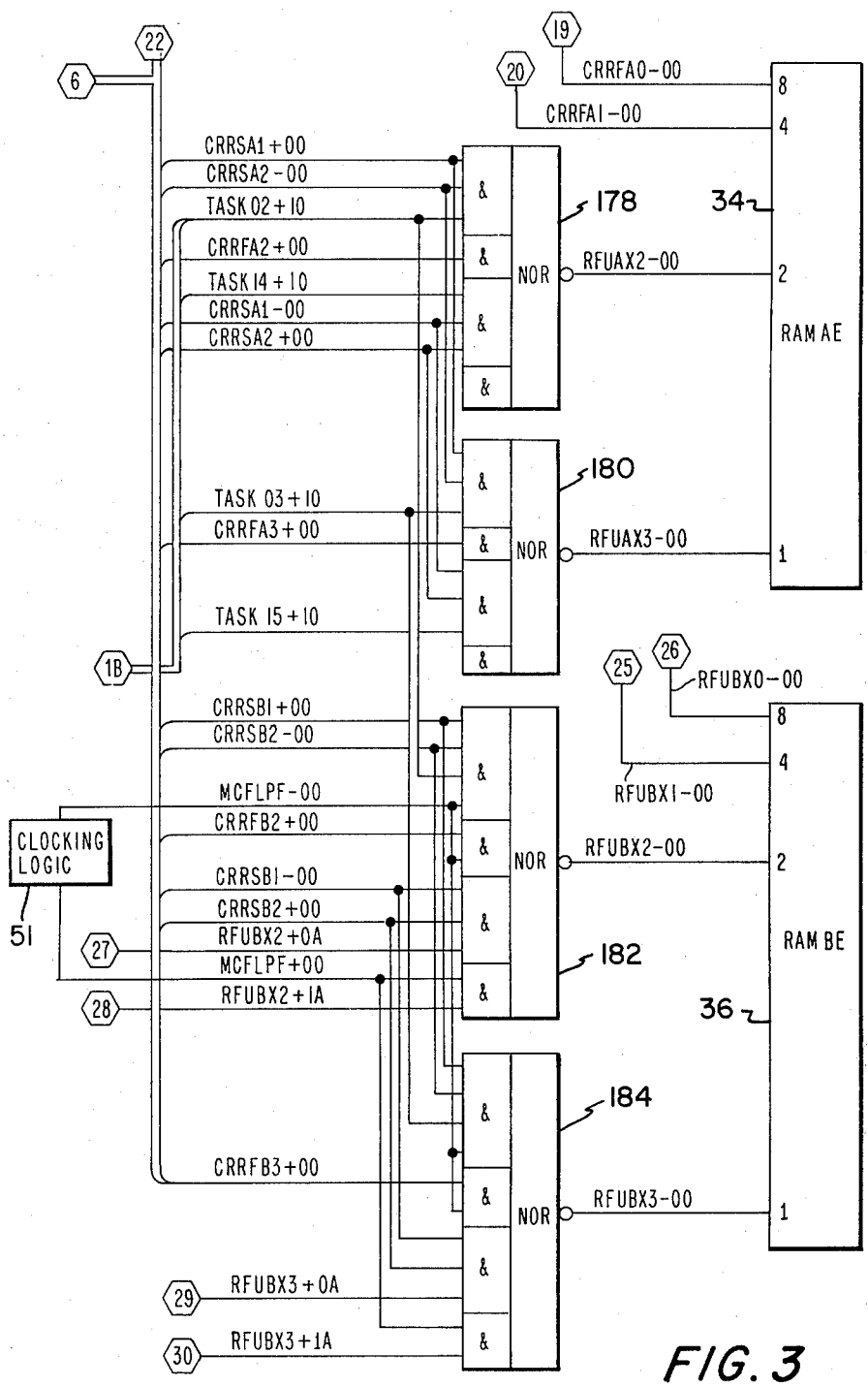

Referring to FIG. 3, output signals TASK02+10 and TASK03+10 of register REGF 62 identify the address location of SA# and output signals TASK14+10 and TASK15+10 identify the address location of SAN or RAMAM 30, RAMBM 32, RAMAE 34, and RAMBE 36.

Output signals M4SMR3+00, M4SMR5+00 and M4SMR7+00 indicate the length of the operand stored in SA1, SA2, and SA3 respectively. A MUX 128 provides an output signal M4ALDN+00 at logical ONE to indicate a four word operand for SA#. Similarly, a MUX 130 provides an output signal M4ALDR+00 to indicate the operand length for SAN. Signal M4ALDN+00 is applied to round 84 in FIG. 4.

Output signals M4SMR2+00, M4SMR4+00, and M4SMR6+00 at logical ONE indicate that the length of the memory 4 data field associated with SA1, SA2 and SA3 respectively is four words, and when at logical ZERO, two words. These signals are applied to a MUX 132 which indicates the memory 4 data field length. The output of MUXs 128, 130 and 132 are applied to inputs of OR gates 136, 138 and 140 respectively. Memory operations are not a part of the invention and are not further described.

Multiplexers 142, 144 and 146 generate output signals RFALNG+00, RFAPN0+00 and RFAPN1+00 under control of firmware signals CRRSA1+00 and CRRSA2+00 from control store 52. Signal RFALNG+00 at logical ONE indicates a four word operand in memory 4. Signal M4LNR+00, at logical ONE, applied to the input terminal 0 of MUX 142 indicates that the memory 4 word associated with SA# is a four word operand. Signal M4ALDP+00, at logical ONE, applied to input terminal 1 of MUX 142 indicates that SA# is a four word operand. The signal M4ALDS+00, at logical ONE, applied to input terminal 2 of MUX 142 indicates that SAN is a four word operand. The signal CRRFA1+00 applied to input terminal 3 permits firmware control of the length address signal RFALNG+00. MUX 148 controls length address signal RFBLNG+00 in a manner similar to the control of signal RFALNG+00 by MUX 142.

Output signals RFAPN0+00 and RFAPN1+00 indicate, under firmware control, the SA# address location when input terminals 1 of 144 and 146 are selected, and the SAN address location when input terminals 2 are selected. Input terminals 3 are controlled by firmware signals CRRFA2+00 and CRRFA3+00 respectively. Firmware signals are generated at MCFLPA+01 time in control store 52.

Output signals RFBLNG+00, RFBPN0+00, and RFBPN1+00 of MUXs 148, 150 and 152 are controlled in a similar manner to output signals RFALNG+00, RFAPN0+00, and RFAPN1+00.

A flop 134 is operative during the cycle in which the result is read out by REGR 56, FIG. 2, to SA# in RAMAM 30 and RAMBM 32, and forces a four word write. Output signal M4ALNG+00 is applied to the inputs of OR gates 136, 138 and 140.

Signals RFALNG+00 and RFBLNG+00 are applied to the inputs of AND/NOR gates 100 and 106. Signals RFAPN0+00 and RFBPN0+00 are applied to the inputs of AND/NOR gates 102 and 108. Signals RFAPN1+00 and RFBPN1+00 are applied to the inputs of AND/NOR gates 104 and 110.

The mantissa of the operand having the smaller exponent is read from RAMBM 32 to shifter 42, FIG. 2. The exponent of SA# is read from RAMAE 34, FIG. 2, into the A input terminal of ALUE1 38, and the exponent of SAN is read from RAMBE 34 into the B input terminal of ALUE1 38. The output signal AUDNCX-00 from ALUE1 38 at logical ONE indicates that the exponent of SA# is smaller than the exponent of SAN. In that case, the mantissa of SA# is read from RAMBM 32 and the mantissa of SAN is read from RAMAM 30. If the exponent of SAN were smaller than the exponent of SA#, then the mantissa of SAN would be read from RAMBM 32 and the mantissa of SA# would be read from RAMAM 30.

Referring to FIG. 3, signal AUDNCX-00 is applied to the input of a NAND gate 170, an AND gate 172 and an AND/NOR gate 174. Firmware signal CREQLZ+00 is at logical ONE for this equalization operation. Signal MCFLPF-00 is at logical ONE since this is not a transfer from a REGR 56, FIG. 2, operation. Therefore, signal MASWAP+00, the output of AND gate 172, is at logical ONE and signal MASWAP-00, the output of NAND gate 170, is at logical ZERO. Also, the output of AND/NOR gate 174, signal MBSWAP+10, is at logical ONE and signal MBSWAP+00, the output of an inverter 176, is at logical ZERO. Therefore, the address signals RFBLNG+00, RFBPN0+00 and RFBPN1+00, which normally control the address selection of RAMBM 32, control the address selection of RAMAM 30 and address signals RFALNG+00, RFAPN0+00, and RFAPN1+00, which normally control the address selection of RAMAM 30, control the address selection of RAMBM 32.

The inputs to AND/NOR gates 154 and 156, signals CRRFA0-00, CRRFA1-00, CRRFB0-00 and CRRFB1-00, are operative under firmware control to generate output signals RFUBX0+0A and RFBUX-1+0A, which are applied to the inputs of AND/NOR gates 112 and 114 respectively. Logic signal MCFLPF+00 is at logical ONE during the register REGR 56 transfer of data to RAMAM 30 and RAMBM 32. Timing signals MCCLKB+11, MCSETF+00, MCFLPF+00 and MCFLPF-00 are generated as clocking logic 51.

Firmware signals CRRFB0+00 and CRRFB1+00 are applied to the AND/NOR gates 112 and 114 respectively. Signal MCFLPF-00 is at logical ONE during the readout of the mantissas, thereby generating the RFUBX0-00 output signal of AND/NOR gate 112, which is applied to input terminal 8 of RAMBM 32, and the RFUBX1-00 output signal of AND/NOR gate 114, which is applied to input terminal 4 of RAMBM 32, bit positions 0-23.

During the equalization operation, that is, when the mantissa swap may take place, the address signals CRRFA0+10 and CRRFA1+10 applied to RAMAM 30 are controlled by the firmware as are the address signals RFUBX0-00 and RFUBX1-00 applied to RAMBM 32.

Output signals RFMAL1-00, RFMAA2-00 and RFMAA3-00 of AND/NOR gates 100, 102 and 104 respectively are applied to the inputs of NOR gates 116, 118 and 120. The output signal RFMAL1+10 of NOR gate 116 is applied to input terminal 4 of RAMAM 30, storing mantissa bits 24 through 55, that is, the long operand words. Output signals RFMAA2+10 and RFMAA3+10 are applied to input terminals 2 and 1 respectively of RAMAM 30. Firmware signals CRRFA0-00 and CRRFA1-00 are applied to the inputs of NOR gates 122 and 124 respectively. The output signal CRRFA0+10 is applied to input terminal 8 of RAMAM 30 and the output signal CRRFA1+10 is applied to input terminal 4 of RAMAM 30, bit positions 0 through 23. NAND gate 126 is operative during the rounding operation to select address location 15 of RAMAM 30 by means of control signal CROUND+00 and timing signal MCFLPF-00 for forcing ZEROs in that location.

Output signals RFMBL1-00, RFMBA2-00 and RFMBA3-00 of AND/NOR gates 106, 108 and 110 respectively are operative with RAMBM 32 and output signals RFMAL1+10, RFMAA2+10 and RFMAA3+10 of AND/NOR gates 100, 102 and 104 respectively are operative with RAMAM 30 through NOR gates 116, 118 and 120.

Figure 4:
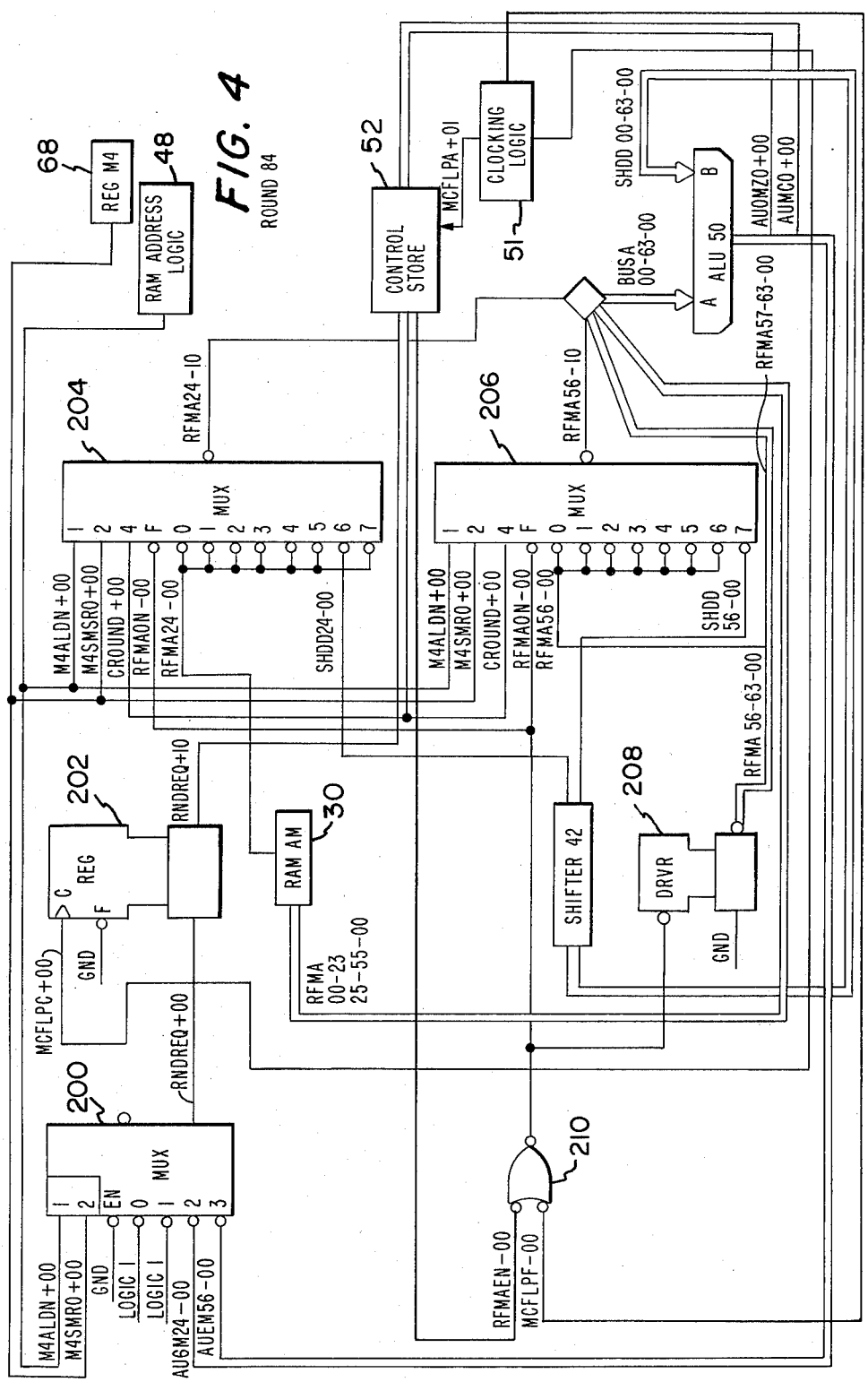
FIG. 4 is a detailed diagram of the rounding logic.

Referring to FIG. 4, the programmer indicates that automatic rounding of the result of a scientific arithmetic operation is required by setting the bit position zero of register REGM4 68 to logical ONE, thereby forcing output signal M4SMR0+00 to logical ONE.

Bit positions 3, 5 and 7 of register REGM4 68 indicate the lengths of scientific accumulators 1, 2 and 3 respectively. A bit at logical ONE indicates a four word operand and a bit at logical ZERO indicates a two word operand.

In addition to rounding, the result may require a normalization cycle to normalize the mantissa, or an overflow mantissa correction cycle to shift the mantissa one digit position to the right. Control store 52 receives a signal AU0MZ0+00 from ALU 50 to indicate that a normalization cycle is required and signal MC0+00 to indicate that an overflow mantissa correction cycle is required. If control store 52 receives a round request signal RNDREQ+10 from a register 202, then control store 52 may initiate a number of actions.

If the result does not require normalization or an overflow mantissa correction but does require rounding, then control store 52 initiates a round cycle and applies a CROUND+00 signal to a MUX 204 and a MUX 206. If the result requires normalization or overflow mantissa correction, then the control store 52 initiates the normalization cycle or the overflow mantissa correction cycle and applies the CROUND+00 signal to MUXs 204 and 206. If rounding is required, the M4SMR0+00 signal, at logical ONE, applied to the select terminal 2 to MUXs 204 and 206, causes the normalized mantissa or the corrected mantissa to be rounded if the bit position to the right of the low order bit position is a binary ONE bit. Note that the round request signal RNDREQ+00 is only effective for signalling the control store 52 to generate a separate rounding cycle.

The TASK02+10 and TASK03+10 signals applied to the select terminals of MUX 142 indicate the scientific accumulator storing the result of the scientific arithmetic operation. Output signal M4ALDN+00 generated by the RAM address logic 48 is at logical ZERO if the scientific accumulator stores a two word result and is at logical ONE if a four word result is stored. The AU0MZ0+00 signal from ALU 50 at logical ZERO indicates that the result is normalized, since it indicates a hexadecimal digit which is not hexadecimal ZERO in the high order position. This indicates that the rounding operation may require a separate cycle or take place in the same cycle that performs the overflow mantissa correction operation. The result stored in SA# therefore is normalized and rounded. This AU0MZ0-00 signal at logical ONE indicates that the high order position of the result is a hexadecimal ZERO. Therefore a normalized cycle is required to shift the result so that the most significant position contains a hexadecimal digit other than hexadecimal ZERO. In this case, the rounding takes place during the normalization cycle.

Even though the rounding is called for by the firmware, the logic tests the ALU 50 output signal AU6M24-00 for logical ONE if the result is a two word operand, or AUEM56-00 for logical ONE if the result is a four word operand. If the appropriate signal AU6M24-00 or AUEM56-00 is at logical ZERO, rounding is not necessary since there will not be a carry into the low order bit positions 23 or 55 of the result.

Signal AU0MC0+00 at logical ONE indicates that there was a mantissa overflow from the ALU 50. This requires a mantissa correction cycle and the rounding, if required, is done on this cycle.

Signal M4SMR0+00 is applied to the select input terminal 2 of MUX 200 and when at logical ONE tests if rounding is required. Signal M4ALDN+00 is applied to the select input terminal 1 of MUX 200 and for the rounding operation selects signal AU6M24-00 if a two word result or AUEM56-00 if a four word result. If the selected signal AU6M24-00 or AUEM56-00 is at logical ZERO indicating a binary ONE, then the round request output signal RNDREQ+00 at logical ONE is clocked into register 202 at MCPLPC+00 time and the output signal RNDREQ+10 is applied to control store 52, thereby forcing a rounding cycle if a normalization or overflow mantissa correction is not required. Note that if the selected signal AU6M24-00 or AUEM56-00 is at logical ONE and rounding is not required, the round request signal RNDREQ+00 remains at logical ZERO. Therefore, with selected signal AU6M24-00 or AUEM56-00 at logical ONE, even if the programmer calls for a rounding cycle, none would result.

The firmware selects the cycle in which the rounding occurs by means of the CROUND+00 signal from control store 52 applied to the select input terminal 4 of MUXs 204 and 206. MUX 204 is enabled at MCFLPF-00 time to round the four word operand.

During the cycle in which the result is rounded, the result is read from RAMBM 32, FIG. 2, through shifter 42 to the B terminal of ALU 50. All ZEROs are read from RAMAM 30. Signals RFMA00-23, 25-55-00 are applied to junction 85. Signals RFMA24, 56-63+00 are applied to junction 85 from round 84. The shifter output signals SHDD24-00 and SHDD56-00 are also applied to round 84.

Signal SHDD24-00 is applied to the input terminal 6 of MUX 204 and is selected if signal M4ALDN+00 is at logical ZERO, indicating a two word operand, signal M4SMR0+00 is at logical ONE, indicating a rounding operation, and control store signal CROUND+00 is at logical ONE, indicating that the rounding operation is to take place on this cycle. If signal SHDD24-00 is at logical ZERO, indicating that bit position 24 contains a binary ONE, output signal RFMA24-10 at logical ZERO is applied to the A input of ALU 50. This will force a carry into the low order bit 23 position of the result, thereby rounding the result.

Similarly, input terminal 7 of MUX 206 is selected if signal M4ALDN+00 is at logical ONE. Signal SHDD56-00 at logical ZERO causes a binary ONE to be added to bit position 56 of the A input of ALU 50 through signal RFMA56-10. This causes a carry into the low order bit position 55, thereby providing a rounded result.

Signal RFMA24-00 is applied to the remaining input terminals of MUX 204 and signal RFMA56-00 is applied to the remaining input terminals of MUX 206 which are active during normal floating point arithmetic operations.

Having shown and described a preferred embodiment of the invention, those skilled in the art will realize that many variations and modifications may be made to affect the described invention and still be within the scope of the claimed invention. Thus, it may be seen that many other elements and combinations thereof may provide the same results and fall within the spirit of the claimed invention. It is the intention, therefore, to limit the invention only as indicated by the scope of the claims.

What is claimed is:

1. Apparatus for performing a scientific arithmetic rounding operation comprising:

memory means for storing a plurality of mantissas and generating a plurality of mantissa signals indicative of the binary value of said plurality of mantissas;

shifter means coupled to said memory means and responsive to a first plurality of mantissa signals for generating shifted mantissa signals;

arithmetic logic means coupled to said memory means and said shifter means and responsive to a second plurality of mantissa signals and said shifted mantissa signals for performing a predetermined arithmetic operation during a first cycle of operation for generating a plurality of result mantissa signals indicative of a binary result of said predetermined arithmetic operation and a normalization and an overflow signal, said plurality of result mantissa signals being stored in said memory means;

rounding means coupled to said arithmetic logic means for receiving a first signal and a second signal of said plurality of result mantissa signals, said rounding means being responsive to a rounding signal and a length signal in a first state for selecting said first signal, and said length signal in a second state for selecting said second signal for generating a round request signal;

control means coupled to said rounding means and responsive to said round request signal for generating a round control signal, said rounding means being responsive to said round control signal and said rounding signal for rounding said binary result during a second cycle of operation;

said control means being further coupled to said arithmetic logic means and responsive to said normalization signal for initiating a normalization cycle during said second cycle of operation, said rounding means being responsive to said round control signal and said rounding signal for rounding said binary result during said normalization cycle, said control means being responsive to said overflow signal for initiating an overflow mantissa correction cycle during said second cycle of operation, said rounding means being responsive to said round control signal and said rounding signal for rounding said binary result during said overflow mantissa correction cycle.

2. The apparatus of claim 1 wherein said memory means comprises:

a first random access memory for storing a first mantissa and for storing said binary result during said first cycle of operation and storing said rounded binary result during said second cycle of operation; and a second random access memory for storing a second mantissa to be operative during said first cycle of operation and storing a third mantissa having a value of binary ZERO to be operative during said second cycle of operation respectively.

3. The apparatus of claim 2 wherein said shifter means comprises:

a shifter logic circuit coupled to said first random access memory and responsive to shift signals and said first plurality of mantissa signals for shifting said first mantissa a first predetermined number of bit positions during said first cycle of operation and for shifting said binary result a second predetermined number of bit positions during said second cycle of operation.

4. The apparatus of claim 3 wherein said rounding means comprises:

a first multiplexer responsive to said rounding signal and said length signal in said first state for selecting said first signal in a first state for generating said rounded request signal during said first cycle of operation, and said first multiplexer being responsive for said rounding signal and said length signal in said second state for selecting said second signal in a first state for generating said round request signal during said first cycle of operation.

5. The apparatus of claim 4 wherein said rounding means further comprises:

a second multiplexer responsive to said rounding signal, said length signal in said first state and said round control signal for selecting a third signal representative of a bit to the right of the least significant bit position of said shifted binary result for adding to said bit position to the right of the least significant position of said shifted binary result for generating a carry into the least significant bit position of said shifted binary result when said third signal is in a first state during said second cycle of operation.

6. The apparatus of claim 5 wherein said rounding means further comprises:
a third multiplexer responsive to said rounding signal, said length signal in said second state and said round control signal for selecting a fourth signal representative of a bit to the right of the least significant bit position of said shifted binary result for generating said carry into the least significant bit position of said shifted binary result when said fourth signal is in a first state during said second cycle of operation.

7. The apparatus of claim 6 wherein said length signal in said first state indicates a two word operand and said length signal in said second state indicates a four word operand.

* * * * *